US012739652B2

(12) United States Patent
Mehta et al.

(10) Patent No.: US 12,739,652 B2
(45) Date of Patent: Sep. 15, 2026

(54) METHOD OF CREATING MULTI-TENANT (RAN) RESOURCES FOR MULTIPLE VENDORS ON A RIC PLATFORM

(71) Applicant: Boost SubscriberCo L.L.C., Englewood, CO (US)

(72) Inventors: Dhaval Mehta, Aldie, VA (US); Siddhartha Chenumolu, Ashburn, VA (US); Sourabh Gupta, Ashburn, VA (US); Sagar Narendrakumar Patel, Dublin, CA (US)

(73) Assignee: Boost SubcsriberCo L.L.C., Englewood, CO (US)

( * ) Notice: Subject to any disclaimer, the term of this patent is extended or adjusted under 35 U.S.C. 154(b) by 249 days.

(21) Appl. No.: 18/524,647

(22) Filed: Nov. 30, 2023

(65) Prior Publication Data

US 2025/0184752 A1 Jun. 5, 2025

(51) Int. Cl.

| | |
|---|---|
| ***H04W 16/16*** | (2009.01) |
| ***H04W 48/16*** | (2009.01) |
| ***H04W 48/18*** | (2009.01) |

(52) U.S. Cl.

CPC ........... *H04W 16/16* (2013.01); *H04W 48/16* (2013.01); *H04W 48/18* (2013.01)

(58) Field of Classification Search

CPC . H04W 48/18; H04W 48/16; H04W 28/0247; H04W 16/14; H04W 16/16

See application file for complete search history.

(56) References Cited

U.S. PATENT DOCUMENTS

| | | | |
|---|---|---|---|
| 2015/0089297 A1 | 3/2015 | Johnson et al. | |
| 2016/0284009 A1 | 9/2016 | Shah | |
| 2017/0013131 A1 | 1/2017 | Craib | |
| 2022/0086686 A1* | 3/2022 | Sorond | G06N 20/00 |

(Continued)

FOREIGN PATENT DOCUMENTS

| | | |
|---|---|---|
| CN | 116264726 A | 6/2023 |
| DE | 3930040 A1 | 3/1991 |

(Continued)

OTHER PUBLICATIONS

Whitepaper (Deutche Telekom and Partners Demonstrate Non-Real Time Ran Optimization in a Multi-Vendor Environment, Sep. 1, 2023) (Year: 2023).*

(Continued)

*Primary Examiner* — Kamran Afshar

(74) *Attorney, Agent, or Firm* — Jeremiah J. Baunach; Frontier IP Law PLLC

(57) ABSTRACT

A disclosed method of managing a muti-tenant RIC platform may include (i) receiving a request to create muti-tenant resources for a first vendor and a second vendor on a RIC platform, (ii) generating a first private network with a first dedicated network controller associated with the first vendor based on the request to create the muti-tenant resources, (iii) generating a second private network with a second dedicated network controller associated with the second vendor based on the request to create the muti-tenant resources, (iv) assigning dedicated network resources to the first private network or second private network based on the request to create the multi-tenant resources, and (v) managing first data associated with the first vendor using the first dedicated network controller and second data associated with the second vendor using the second dedicated network controller. Related systems and computer-readable mediums are further disclosed.

20 Claims, 7 Drawing Sheets

600

(56) References Cited

U.S. PATENT DOCUMENTS

| | | | | |
|---|---|---|---|---|
| 2022/0217046 | A1 | 7/2022 | Sartori et al. | |
| 2022/0326995 | A1 * | 10/2022 | Wang | G06F 9/45558 |
| 2023/0188233 | A1 | 6/2023 | Gupta et al. | |
| 2023/0188607 | A1 * | 6/2023 | Tangirala | H04L 63/166 709/228 |
| 2024/0098568 | A1 | 3/2024 | Curic et al. | |
| 2024/0163649 | A1 * | 5/2024 | Akman | H04W 24/04 |
| 2024/0251321 | A1 * | 7/2024 | Mcdonald | H04W 76/12 |
| 2025/0392985 | A1 * | 12/2025 | Lee | H04B 17/336 |

FOREIGN PATENT DOCUMENTS

| | | | | |
|---|---|---|---|---|
| WO | 2019/072147 | A1 | 4/2019 | |
| WO | 2023/283102 | A1 | 1/2023 | |
| WO | 2023/028310 | A1 | 3/2023 | |
| WO | WO-2023172292 | A2 * | 9/2023 | G06N 20/00 |

OTHER PUBLICATIONS

Brik, Bouziane, et al. "A survey on explainable AI for 6G O-RAN: Architecture, use cases, challenges and research directions." arXiv preprint arXiv:2307.00319 (2023). (Year: 2023).*

Dhaval Mehta et al., "Disaggregated Application on a RAN Controlled via RIC Platform," U.S. Appl. No. 18/505,384, filed Nov. 9, 2023. (24 Pages).

Dhaval Mehta et al., "RIC Architecture With Platform Extension and Adapters," U.S. Appl. No. 18/515,957, filed Nov. 21, 2023. (22 Pages).

Brik, B., et al., "A Survey on Explainable AI for 6G O-RAN: Architecture Use Cases, Challenges and Research Directions", arxiv.org, Jul. 1, 2023, 14 pages.

International Search Report and Written Opinion received for PCT Patent Application No. PCT/US24/55104, mailed on Feb. 13, 2025, 10 pages.

International Search Report and Written Opinion received for PCT Patent Application No. PCT/US24/56269, mailed on Feb. 7, 2025, 12 pages.

Rahman, T. F., et al., "O-RAN Perspective on Industrial Internet of Things: A SWOT Analysis", 2023 IEEE International Conference on Industrial Technology (ICIT), Apr. 4, 2023, pp. 1-6.

Whitepaper, A., et al., "Deutsche Telekom and Partners Demonstrate Non-Real Time Ran Optimization in a Multi-Vendor Environment", Sep. 1, 2023, 25 pages.

* cited by examiner

Near-RT RIC 106

E2 Manager 304 xAPP 316n

Message Bus 340

Virtual Near-RT RIC 402

Virtual E2 Manager 404

Virtual xAPP 416n

Virtual Message Bus 440

Vendor1 302a

Vendor2 302b

600

Receive request to create multi-tenant resources for first vendor and second vendor on RIC platform
602

Generate first private network with first dedicated network controller associated with first vendor and first dedicated network resources associated with first vendor
604

Generate second private network with second dedicated network controller associated with second vendor and second dedicated network resources associated with second vendor
606

Manage first data associated with first vendor using first dedicated network controller and second data associated with second vendor using second dedicated network controller
608

Execute first network function using first dedicated network resources based on first data and second network function using second dedicated network resources based on second data
610

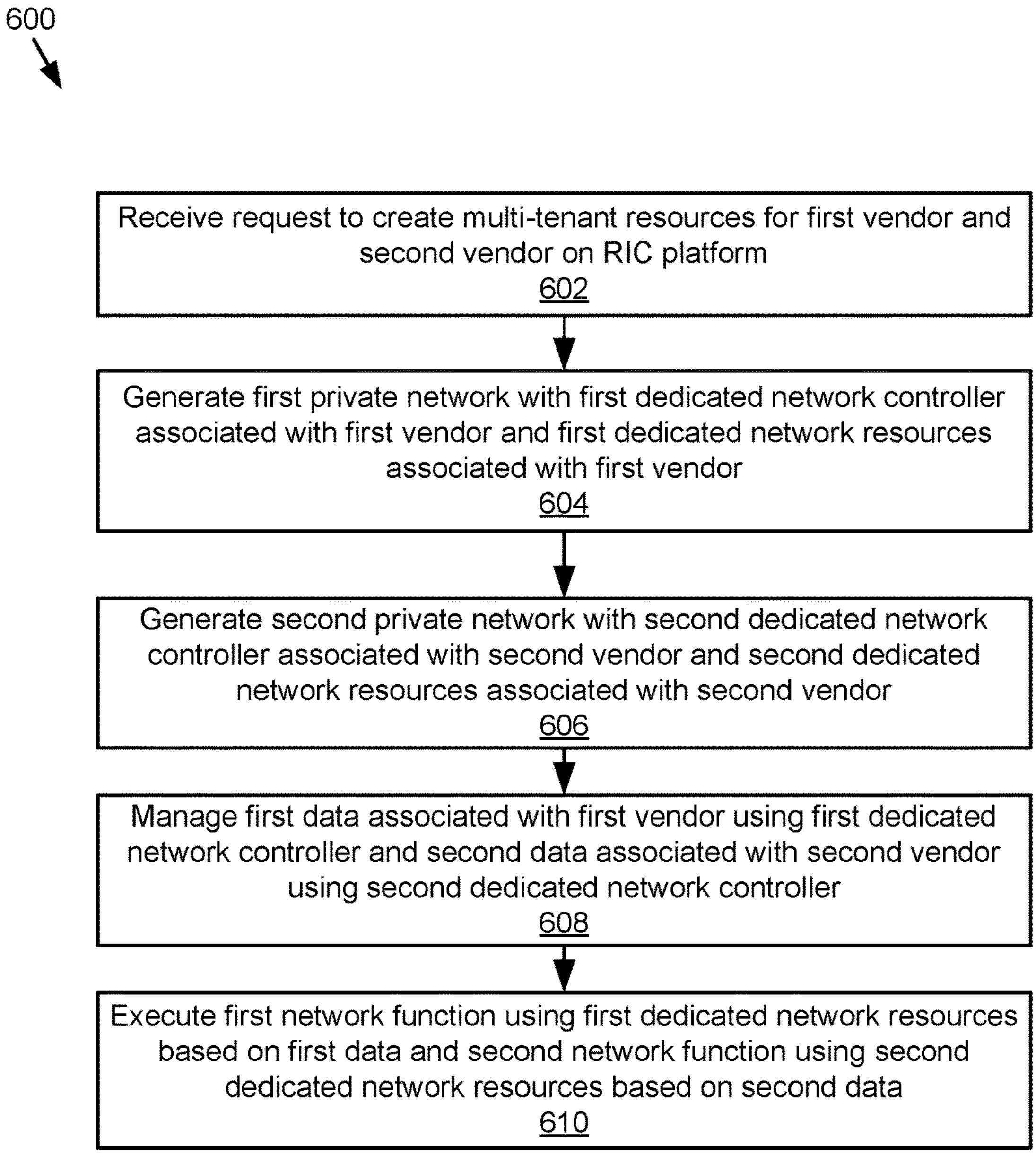

Figure 6

METHOD OF CREATING MULTI-TENANT (RAN) RESOURCES FOR MULTIPLE VENDORS ON A RIC PLATFORM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A READ-ONLY OPTICAL DISC, AS A TEXT FILE OR AN XML FILE VIA THE PATENT ELECTRONIC SYSTEM

Not Applicable

STATEMENT REGARDING PRIOR DISCLOSURES BY THE INVENTOR OR A JOINT INVENTOR

Not Applicable

BACKGROUND OF THE INVENTION

Field of the Invention

Not Applicable

Description of Related Art Including Information Disclosed Under 37 CFR 1.97 and 198

Not Applicable

BRIEF SUMMARY OF THE INVENTION

This disclosure is generally directed to multi-tenant Radio Access Network (RAN) intelligent controller RIC applications controlled via a RIC platform in the context of a telecommunications network where the RIC is able to communicate with the platform extension and adapters to provide network functions for different vendors services. Historically, a RAN intelligent controller (RIC) was a software-defined component of the open radio access network (O-RAN) that was responsible for controlling and optimizing RAN functions. The O-RAN set a standard for virtual RAN run on standard servers. Historically, the RIC was able to service commercial vendors using the network resources available on the RIC, however, the RIC was unable to efficiently use resources in a way that allowed for multiple vendors to use redundant resources efficiently. In one example, a method may include (i) receiving a request to create muti-tenant resources for a first vendor and a second vendor on a RIC platform, (ii) generating a first private network with a first dedicated network controller associated with the first vendor based on the request to create the muti-tenant resources, (iii) assigning first dedicated network resources of the first private network associated with the first vendor based on the request to create the multi-tenant resources, (iv) generating a second private network with a second dedicated network controller associated with the second vendor based on the request to create the muti-tenant resources, (v) assigning second dedicated network resources of the second private network associated with the second vendor based on the request to create the multi-tenant resources, (vi) managing first data associated with the first vendor using the first dedicated network controller and second data associated with the second vendor using the second dedicated network controller, and (vii) executing a network function using the first dedicated network resources based on the first data.

In one example, the RIC platform is a non-real time RIC and the network function is a delay tolerant network function.

In one example, the first dedicated network controller is a first dedicated rApplication (rAPP) and the second dedicated network controller is a second dedicated rAPP of the non-real time RIC.

In one example, the first private network is only accessible with the first dedicated network controller and the second private network is only accessible with the second dedicated network controller.

In one example, the first data associated with the first vendor in the first private network is not accessible by the second dedicated network controller.

In one example, the RIC platform is a near-real time RIC and the network function is a time-sensitive network function.

In one example, the first dedicated network controller is a first dedicated xApplication (xAPP) and the second dedicated network controller is a second dedicated xAPP of the near-real time RIC.

In one example, the first dedicated xAPP accesses first vendor data from stored first private data of the first private network and the second dedicated xAPP accesses second vendor data from stored second private data of the second private network.

In one example, the first private network and the second private network operate simultaneously on the RIC platform.

This application also further discloses a non-transitory computer-readable medium encoded with instructions that, when executed by a physical processor of a computing device, cause the computing device to perform the method of one or more embodiments of the method outlined above.

This application also further discloses a system configured to perform one or more of the embodiments outlined above.

BRIEF DESCRIPTION OF THE SEVERAL VIEWS OF THE DRAWING(S)

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings.

FIG. 6 shows a flowchart of an example method of using multi-tenant network applications on a RIC platform.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current disclosure. The phrases "in one embodiment," "in another embodiment," "in various embodiments," "in some embodiments," "in other embodiments," or "in one implementation," "in another implementation," "in various implementations," "in some implementations," "in other implementations," and other variations thereof refer to one or more features, structures, functions, limitations, or characteristics of the present disclosure, and are not limited to the same or different embodiments unless the context clearly dictates otherwise. As used herein, the term "or" is an inclusive "of" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
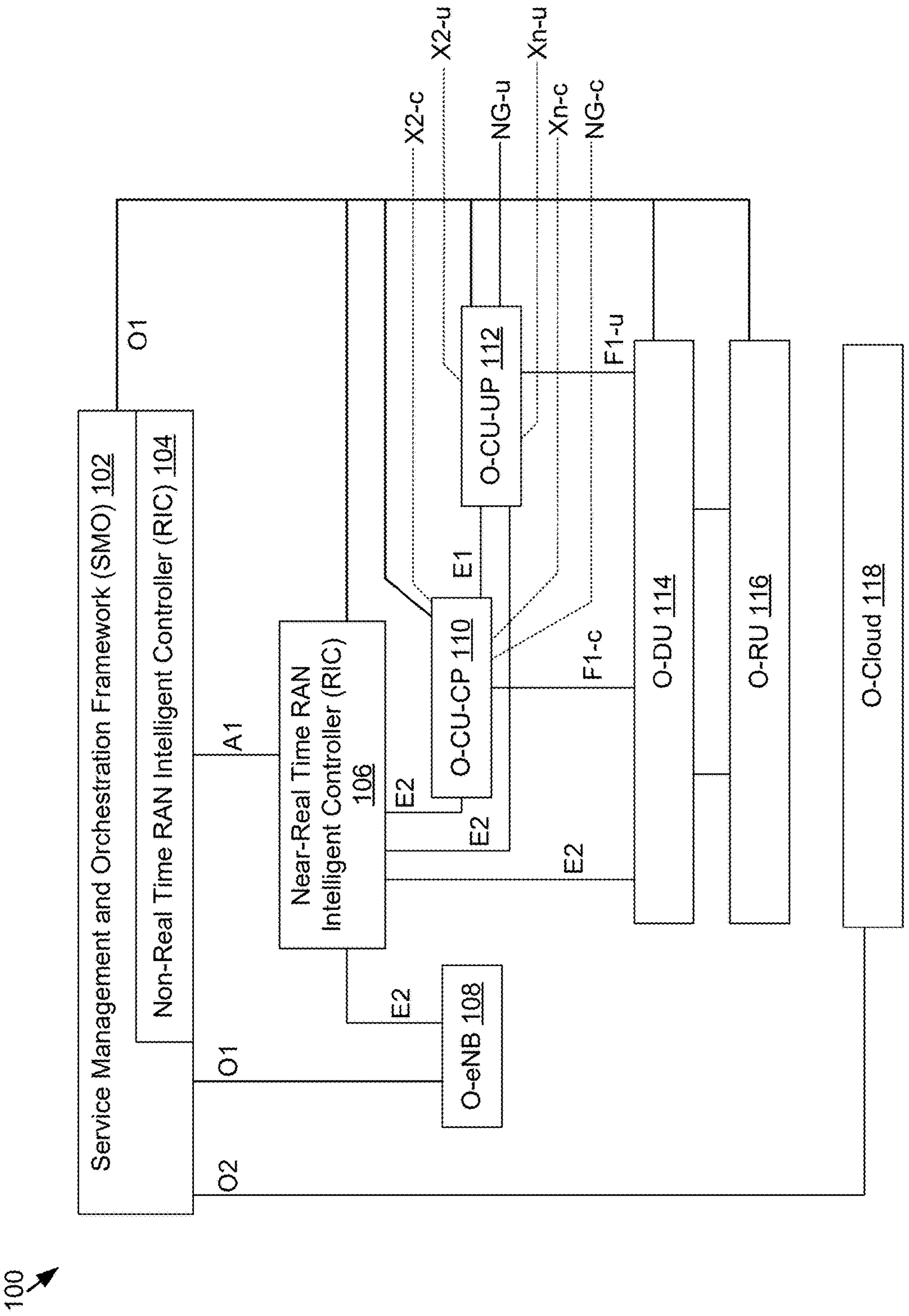
FIG. 1 shows an example open radio area network architecture including a real time RIC and a near-real time RIC.

FIG. 1 shows an illustrative architecture 100 corresponding to the open radio access network (O-RAN) architecture. In this example, the open radio access network software community (O-RAN SC) architecture follows the O-RAN alliance defined architecture. The O-RAN standard introduced a radio access network intelligent controller (RIC) and broke out the functionality of the RIC into non-real time actions that processed any delay tolerant actions and near-real time actions that covered any immediate actions.

Architecture 100 may include a service management and orchestration framework (SMO) 102, which may interface with other components of the architecture 100, such as, an Open Cloud (O-Cloud) 118 and a near-real time radio access network intelligent controller (RIC) 106. SMO 102 may further include a non-real time radio access network intelligent controller (RIC) 104. In some implementations, near-real time radio access network intelligent controller 106 may further communicate with an evolved NodeB (O-eNB) 108, which in some implementations corresponds to the hardware aspect of a 4G radio access network. Near-real time radio access network intelligent controller 106 also further interfaces with centralized units (CU), including an open centralized unit-control plane node (O-CU-CP) 110 and an open centralized unit-user plane node (O-CU-UP) 112, as well as an open distributed unit (O-DU) 114, and an open radio unit (O-RU) 116, as further shown in FIG. 1. Since the non-real time RIC 104 handles the delayed tolerant applications, the non-real time RIC 104 can communicate using the O1 interface. As shown in FIG. 1, the O1 interface is not delay sensitive, whereas the near-real time RIC 106 is configured to control time sensitive applications and uses the E2 network interface for time-sensitive applications. In various embodiments, the technology of this disclosure may focus upon communications and interactions between O-DU 114, O-CU-CP 110, and/or O-CU-UP 112. FIG. 1 also further illustrates how architecture 100 may further include a multitude of communication lines interconnecting various ones of the components outlined above.

In the context of FIG. 1, radio access network (e.g., gNB, gNodeB, or base station) disaggregation corresponds to an initial phase of the deployment of Fifth Generation (5G) technology, and a major application will be Enhanced Mobile Broadband (eMMB). Radio access network disaggregation can be performed according to the 3rd Generation Partnership Project (3GPP) or according to the O-RAN specification illustrated in the illustrative example of FIG. 1.

Figure 2:
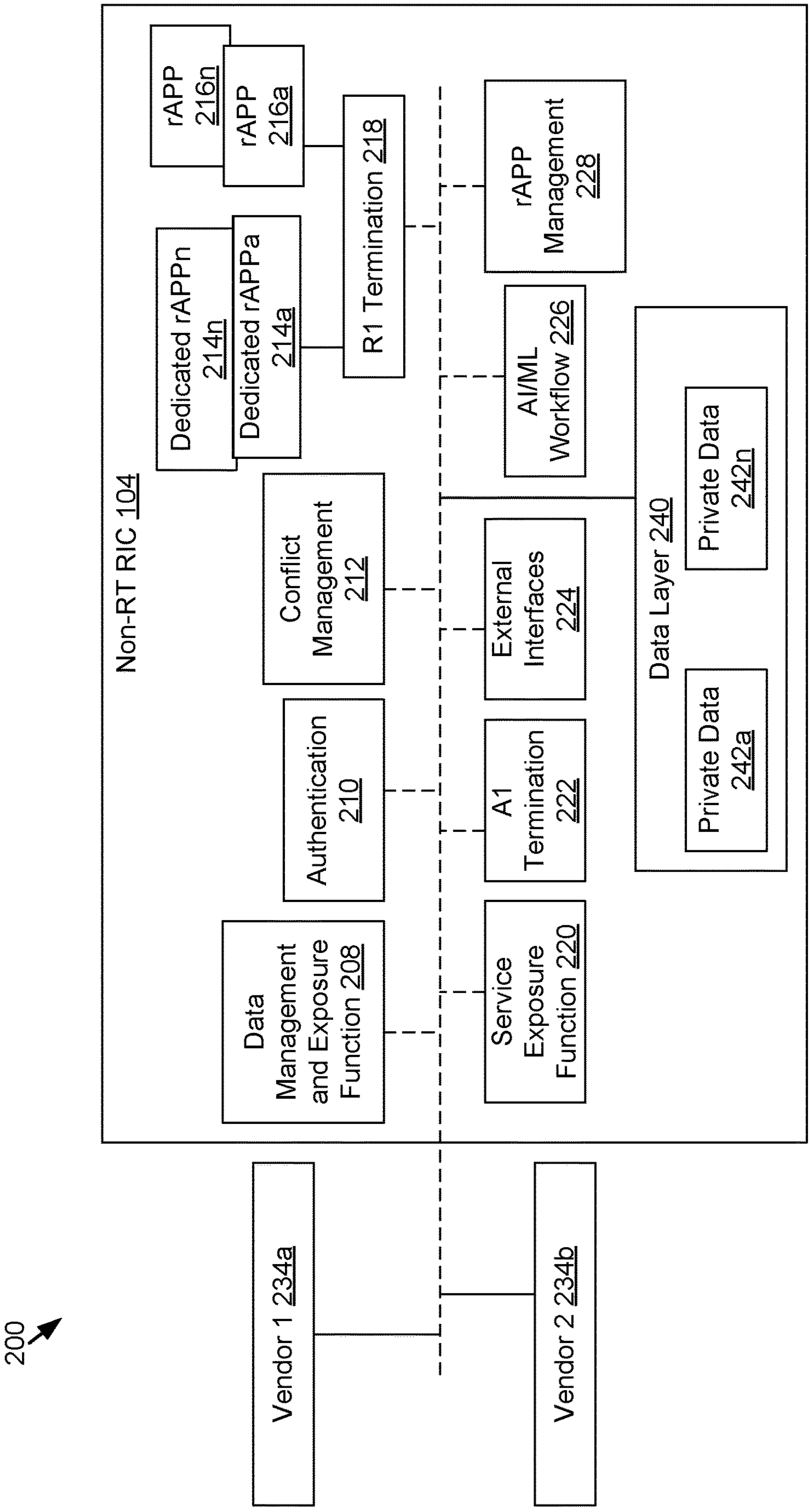
FIG. 2 shows an example of multi-tenant network applications on a non-real time RIC.

FIG. 2 shows an illustrative architecture 200 of an example non-RT RIC 104. As shown, architecture 200 may include a non-RT RIC 104 as described with respect to FIG. 1, which may interface with various vendors 234, such as vendor1 234*a* or vendor2 234*b*, for various applications in the system 100. As shown in the architecture 200, the Non-RT RIC 104 may include one or more functions inside the RIC platform, such as a data management and exposure function 208, an authentication function 210, a conflict management function 212, a service exposure function 220, an A1 termination 222, external interfaces 224, artificial intelligence and/or machine learning AI/ML workflow 226, rApplication (rAPP) management 228, R1 termination 218, data layer 240, dedicated rAPP 214, and/or rAPP 216.

As shown in FIG. 2, the vendors 234 may interact with the non-RT RIC 104 to request various network functions of the RIC platform. For example, in one implementation, vendor 1 234*a* may be a commercial vendor and vendor2 234*b* may be a private vendor. Both vendor 234*a* and vendor 234*b* may be requesting to use network functions of the non-RT RIC 104. When multiple vendors may request to use network functions of the non-RT RIC 104, the non-RT RIC 104 may interpret that as a request to create muti-tenant resources on the non-RT RIC 104. In response to the request, the non-RT RIC 104 may create the multi-tenant resources by assigning one or more controllers, such as an rAPP 216 in the non-RT RIC 104 example, as a dedicated network controller, or a dedicated rAPP 214 as shown in the example of the non-RT RIC 104. The dedicated controller, such as dedicated rAPP 214 in the non-RT RIC 104 example may be able to control vendor data and/or network functions for an associated vendor that the dedicated controller is responsible for. In some implementations, the dedicated rAPP 214*a* may be assigned to manage the vendor data and/or network functions for vendor1 234*a* and the dedicated rAPP 214*b* may be assigned to manage the vendor data and/or network functions for vendor2 234*b*. By using the dedicated rAPPs 214, a non-RT RIC 104 may be able to provide commercial network services for a commercial vendor, such as vendor1 234*a* in the example in FIG. 2, while the non-RT RIC 104 may also be able to provide private network functions for a private vendor, such as vendor2 234*b* and the non-RT RIC 104 may be able share certain resources of the non-RT RIC 104 to efficiently provide for multi-tenant service of both vendors on the same non-RT RIC 104.

In some implementations, the dedicated rAPP 214 may work with other dedicated resources within the non-RT RIC 104 and only the dedicated rAPP 214 has access to the other dedicated resources on the non-RT RIC 104 in order to keep the vendor data and/or network functions private for each of the vendors in the muti-tenant RIC platform. For example, in some implementations, the dedicated rAPP 214 may be the only component of the non-RT RIC 104 that can access the private data 242 associated with the vendor 234 in the data layer 240. In some implementations, different dedicated rAPPs 214 may be generated or assigned for each vendor 234 that is requesting to use the shared network resources in a multi-tenant network function. Each of the dedicated rAPPs 214 are the only network resources able to access and manage stored vendor data, such as private data 242, or execute network functions on the non-RT RIC 104. By separating the rAPP 216 as a dedicated rAPP 214 or other dedicated controller, the non-RT RIC 104 is able to share various network resources while also allowing private vendor data to be separate. It should be understood that while two vendors 234*a* and 234*b* are shown in this example, any number of vendors 234 may be using a muti-tenant RIC platform based on the available network resources to separate the multiple vendors and it is not just limited to two vendors 234*a* and/or 234*b* as shown in the example in FIG. 2.

Figure 3:
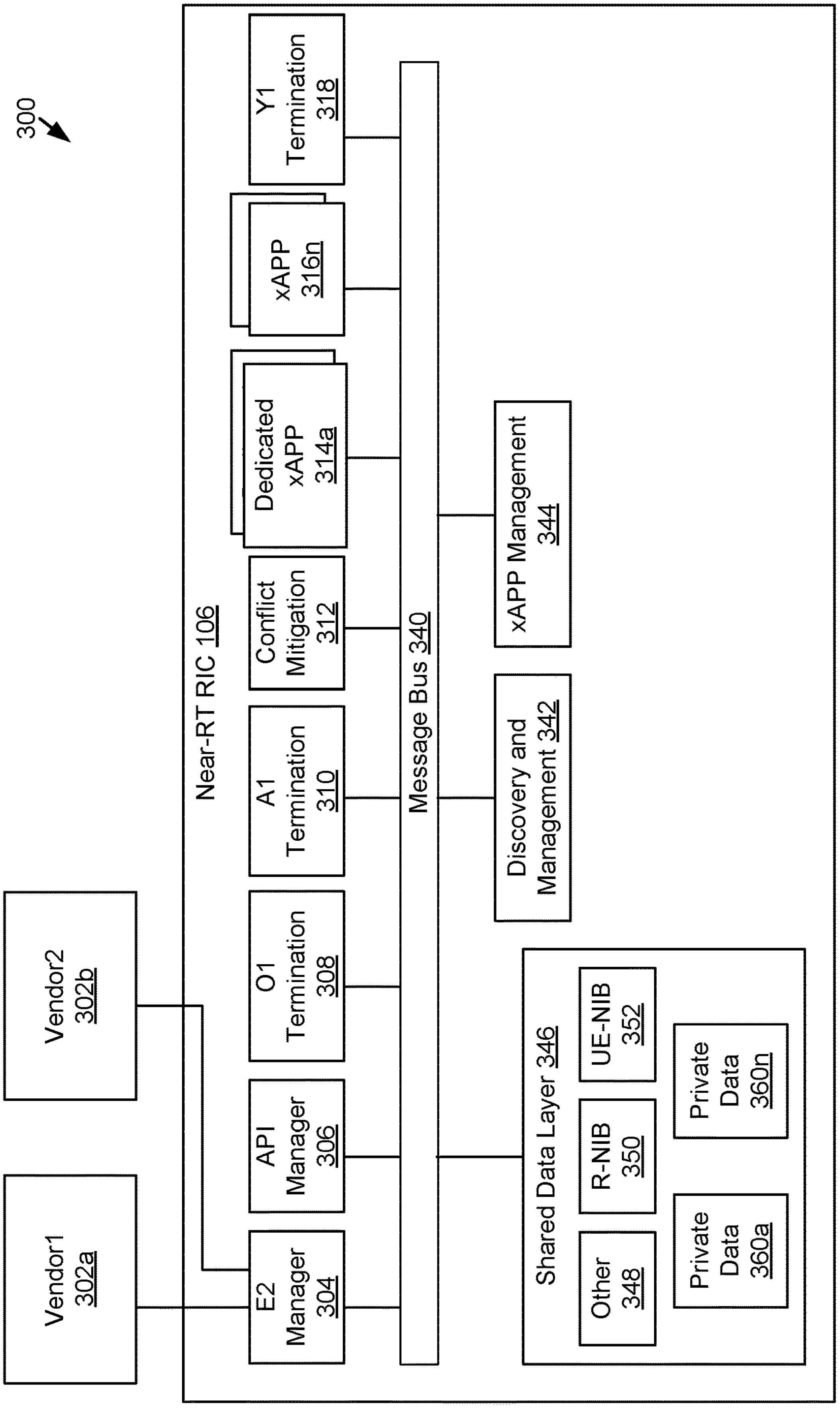
FIG. 3 shows an example of multi-tenant network applications on a near-real time RIC.

FIG. 3 shows an illustrative architecture 300 of an example near-RT RIC 106 in a muti-tenant RIC platform. As shown, architecture 300 may include a near-RT RIC 106 as described with respect to FIG. 1, which may interface with one or more vendors 302 that may request various network functions of the near-real time RIC 106 for various applications in the system 100. As shown in the architecture 300, the near-RT RIC 106 may include one or more functions inside the RIC platform, such as an E2 manager 304, an API manager 306, a O1 termination 308, an A1 termination 310, a conflict mitigation 312, one or more dedicated xApplications (xAPPs) 314, one or more xAPPs 216, a Y1 termination, discovery and management 342, xAPP management, and/or a shared data layer 346 including one or more of other 348, R-NIB 350, UE-NIB 352, and/or private data 360. As shown in FIG. 3, the various components E2 Manager 304, application program interface (API) Manager 306, O1 termination 308, A1 termination 310, and/or Y1 termination 318 allow for data flow to and from the various data lines shown in system 100 in FIG. 1.

As shown in FIG. 3, the vendors 302 may interact with the near-RT RIC 106 to request various network functions of the RIC platform. For example, in one implementation, vendor1 302*a* may be a commercial vendor and vendor2 302*b* may be a private vendor. Both vendor 302*a* and vendor 302*b* may be requesting to use network functions of the near-RT RIC 106. When multiple vendors may request to use network functions of the near-RT RIC 106, the near-RT RIC 106 may interpret that as a request to create muti-tenant resources on the near-RT RIC 106. In response to the request, the near-RT RIC 106 may create the multi-tenant resources by assigning one or more controllers, such as an xAPP 316 in the near-RT RIC 106 example, as a dedicated network controller, or a dedicated xAPP 314 as shown in the example of the near-RT RIC 106. The dedicated controller, such as dedicated xAPP 314 in the Near-RT RIC 106 example may be able to control vendor data and/or network functions for an associated vendor that the dedicated controller is responsible for. In some implementations, the dedicated xAPP 314*a* may be assigned to manage the vendor data and/or network functions for vendor1 302*a* and the dedicated xAPP 314*b* may be assigned to manage the vendor data and/or network functions for vendor2 302*b*. By using the dedicated xAPPs 314, a Near-RT RIC 106 may be able to provide commercial network services for a commercial vendor, such as vendor1 302*a* in the example in FIG. 3, while the near-RT RIC 106 may also be able to provide private network functions for a private vendor, such as vendor2 302*b* and the near-RT RIC 106 may be able share certain resources of the near-RT RIC 106 to efficiently provide for multi-tenant service of both vendors on the same near-RT RIC 106.

In some implementations, the dedicated xAPP 314 may work with other dedicated resources within the near-RT RIC 106 and only the dedicated xAPP 314 has access to the other dedicated resources on the near-RT RIC 106 (e.g., no other xAPP 316 has access to resources assigned and/or generated for a dedicated xAPP 314) in order to keep the vendor data and/or network functions private for each of the vendors in the muti-tenant RIC platform. For example, in some implementations, the dedicated xAPP 314 may be the only component of the near-RT RIC 106 that can access the private data 360*a* associated with the vendor1 302*a* in the shared data layer 346. In some implementations, different dedicated xAPPs 314 may be generated or assigned for each vendor 302 that requests to use the shared network resources in a multi-tenant network function. Each of the dedicated xAPPs 314 are the only network resources able to access and manage stored vendor data, such as private data 360, or execute network functions on the near-RT RIC 106. In some implementations, only the dedicated xAPP 314 that is managing the private network for a specific vendor 302 will be able to see any of the data, such as vendor data or vendor network functions, associated with that vendor 302. None of the other vendors 302 of the multi-tenant RIC platform are able to access and/or view any data associated with other vendors 302. By separating the xAPP 316 as a dedicated xAPP 314 or other dedicated controller, the near-RT RIC 106 is able to share various network resources while also allowing private vendor data to be separate. It should be understood that while two vendors 302*a* and 302*b* are shown in this example, any number of vendors 302 may be using a muti-tenant RIC platform based on the available network resources to separate the multiple vendors and it is not just limited to two vendors 302*a* and/or 320*b* as shown in the example in FIG. 3.

As shown in FIG. 3, the near-RT RIC 106 is delay sensitive, so delay sensitive communications, such as vendor data and/or vendor network requests come in through the E2 line and the E2 manager 304. It should be understood that using the multi-tenant RIC platform with dedicated xAPPs 314 that control access for network functions and/or private data associated with different vendors 302 are still able to perform these actions in a delay sensitive manner. The E2 manager 304 is simple directing specific vendor requests to specific dedicated xAPPs 314 to service specific vendors 302 associated with those dedicated xAPPs 314 while the other available near-RT RIC 106 resources are shared between the different vendors 302 in the multi-tenant RIC platform as appropriate. As shown in FIG. 3, while vendor data will still come in through the E2 manager 304, that vendor data is isolated by the dedicated controller, such as the dedicated xAPP 314 so that no other applications of the RIC platform will see that the vendor specific RAN functions are connected to the platform. This allows multiple vendors 302 to receive various network function support using the RIC platforms without needing to generate and run separate RIC platforms for each of the vendors. Instead, a dedicated controller, such as a dedicated xAPP 314 or dedicated rAPP 214 based on the RIC platform, manages the vendor data for each of the vendors on the same RIC platform to provide for a more efficient use of the RIC platform and network resources.

Figure 4:
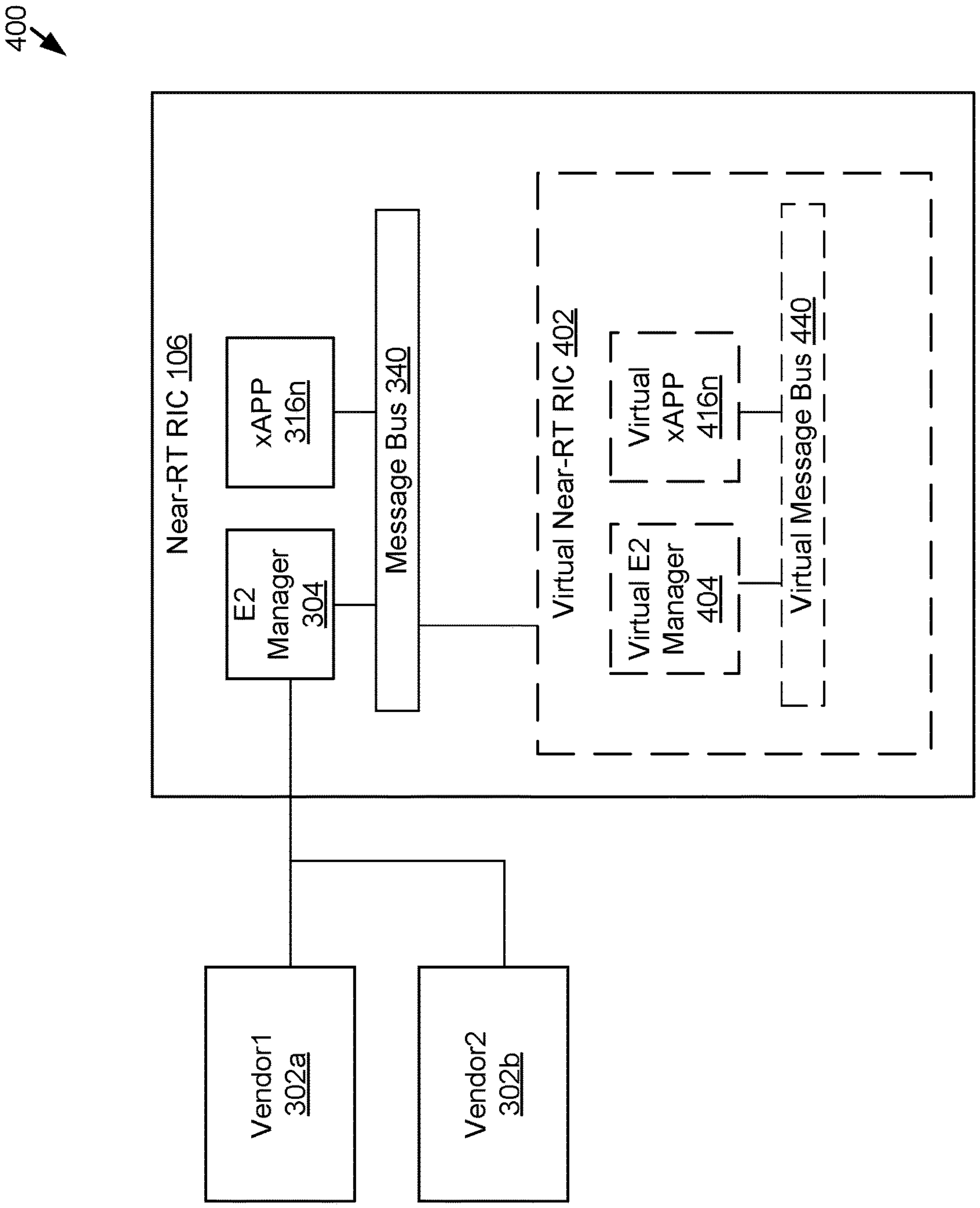
FIG. 4 shows an example of a virtual RIC platform on a near-real time RIC.

FIG. 4 shows an illustrative architecture 400 of an example of a virtual RIC platform 402 on a near-real time RIC 106. As shown in this example, in some implementations, instead of setting up a dedicated xAPP 314 as described in FIG. 3, the RIC platform can instead host a virtual near-RT RIC 402 where the network resources support generating an entire virtual near-RT RIC 402 to provide services for a specific vendor. For example, as shown in FIG. 4, a first vendor1 302*a* may be a commercial vendor that is using the resources on the near-RT RIC 106 including the xAPPs 316*n* and other network resources, such as some of the resources shown in FIG. 3. A request may be received by the near-RT RIC 106 from a second vendor2 302*b* to use some of the RIC platform resources. When the near-RT RIC 106 determines that there are enough extra resources, the near-RT RIC 106 may generate an entire virtual near-RT RIC 402 within the RIC platform. As shown in FIG. 4, the virtual near-RT RIC 402 may include a virtual E2 manager 404 that receives delay sensitive vendor requests from the second vendor2 302*b* and the virtual xAPP 416*n* may provide network support on the RIC platform for the vendor2 302*b*, while simultaneously, the xAPP 316*n* may be providing support using the near-RT RIC 106 for the first vendor1 302*a*. By generating a separate virtual near-RT RIC 402, the vendor request between the two vendors 302 are isolated and private, while still allowing both vendors to receive RIC platform support.

Figure 5:
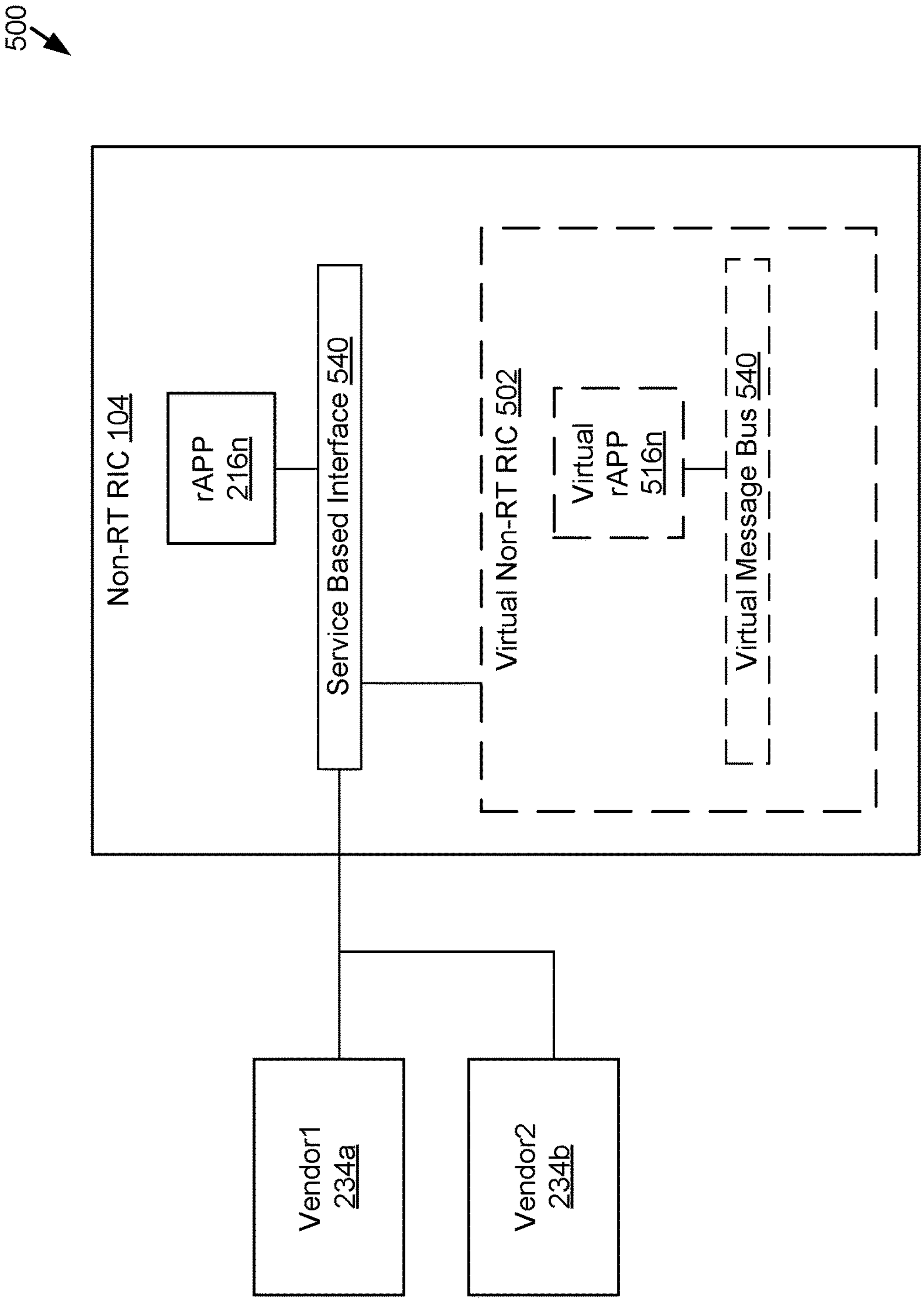
FIG. 5 shows an example of a virtual RIC platform on a non-real time RIC.

FIG. 5 shows an illustrative architecture 500 of an example of a virtual non-RT RIC platform 502 on a non-RT RIC 104. As shown in this example, in some implementations, instead of setting up a dedicated rAPP 214 as described in FIG. 2, the RIC platform can instead host a virtual non-RT RIC 502 where the network resources support generating an entire virtual non-RT RIC 502 to provide services for a specific vendor. For example, as shown in FIG. 5, a first vendor1 234*a* may be a commercial vendor that is using the resources on the non-RT RIC 104 including the rAPPs 216*n* and other network resources, such as some of the resources shown in FIG. 2. A request may be received by the non-RT RIC 104 from a second vendor2 234*b* to use some of the RIC platform resources. When the non-RT RIC 104 determines that there are enough extra resources, the non-RT RIC 104 may generate an entire virtual non-RT RIC 502 within the RIC platform. As shown in FIG. 5, the virtual non-RT RIC 502 may receive network request for the RIC platform from the second vendor2 234*b* and the virtual rAPP 516*n* may provide network support on the RIC platform for the vendor2 234*b*, while simultaneously, the rAPP 216*n* may be providing support using the non-RT RIC 104 for the first vendor1 234*a*. By generating a separate virtual non-RT RIC 502, the vendor request between the two vendors 234 are isolated and private, while still allowing both vendors to receive RIC platform support.

FIG. 6 shows a flowchart 600 of an example method of a using multi-tenant network applications on a RIC platform. At 602 a RIC platform, such as a non-RT RIC 104 and/or a near-RT RIC 106, may receive a request to create mutitenant resources for one or more of first vendor, such as vendors 234 and/or vendors 302, on the RIC platform. In some implementations, the request to create the multi-tenant resources may be a request from a vendor to use the resources of the RIC platform that is currently being used by one or more other vendors. In some implementations, the request may be anticipated when a small vendor, such as private vendor request to use network resources on the RIC platform and the RIC platform may anticipate future vendors also requesting network resources and may preemptively initiate multi-tenant resources for the first vendor.

At 604, the RIC platform may generate a first private network with one or more dedicated network controllers for use in network operations associated with the first vendor. At 606, the RIC platform may separately generate a second private network with one or more dedicated controllers for use in network operations associated with the second vendor. It should be understood that the term private network refers to the partitioning of the dedicated controllers of the RIC platform, such as the xAPPs 316 in a near-RT RIC 106 or the rAPPs 216 in a non-RT RIC 104. The partitioning of these dedicated controllers of the RIC platform means that to each of the vendors, it appears that no other vendors are using the RIC platform, while from the RIC platform perspective, requests and/or data are being managed by the dedicated controllers that only allow requests and/or data associated with the vendor of the private network the dedicated controllers support to use the RIC platform and no other controller of the RIC platform can access or view those actions on the private network. In some implementations, generating the private network may include generating a dedicate controller, which in some implementations may include assigning an existing controller of the RIC platform, such as an xAPP 316 or rAPP 216 to be a dedicated controller for a specific vendor. In some implementations, generating the private network may further include dedicating various network resources of the RIC platform as dedicated network resources for the specific vendor. For example, specific network functions used by the dedicated xAPP 314 or dedicated rAPP 214 may be assigned or generated for use only with those specific dedicated controllers. In some implementations, generating the private network may further include generating or partitioning private data 242/360 that is accessed and/or managed only by the dedicated controllers.

At 608, the RIC platform may manage data associated with the first vendor by using the first dedicated network controller, such as a dedicated xAPP 314*a* or dedicated rAPP 214*a* and the RIC platform may separately manage data associated with the second vendor by using the second dedicated network controller, such as dedicated xAPP 314*b* or dedicated rAPP 214*b*. Managing the data may include sending and receiving network information of the RIC platform related to the vendor, such as vendor data stored in the private data 242/360, etc. At 610, in some implementations, the RIC platform may execute a network function using dedicated network resources based on the vendor data. The executed network functions may be executed separately for a first vendor and a second vendor by the separate dedicated controllers for each of the vendors. In some implementations, the network functions may be executed without either vendor knowing that the vendor functions are on a multi-tenant RIC platform with shared RIC platform resources. Both vendors would appear to be using separate RIC platforms with no access to the data of other vendors.

Figure 7:
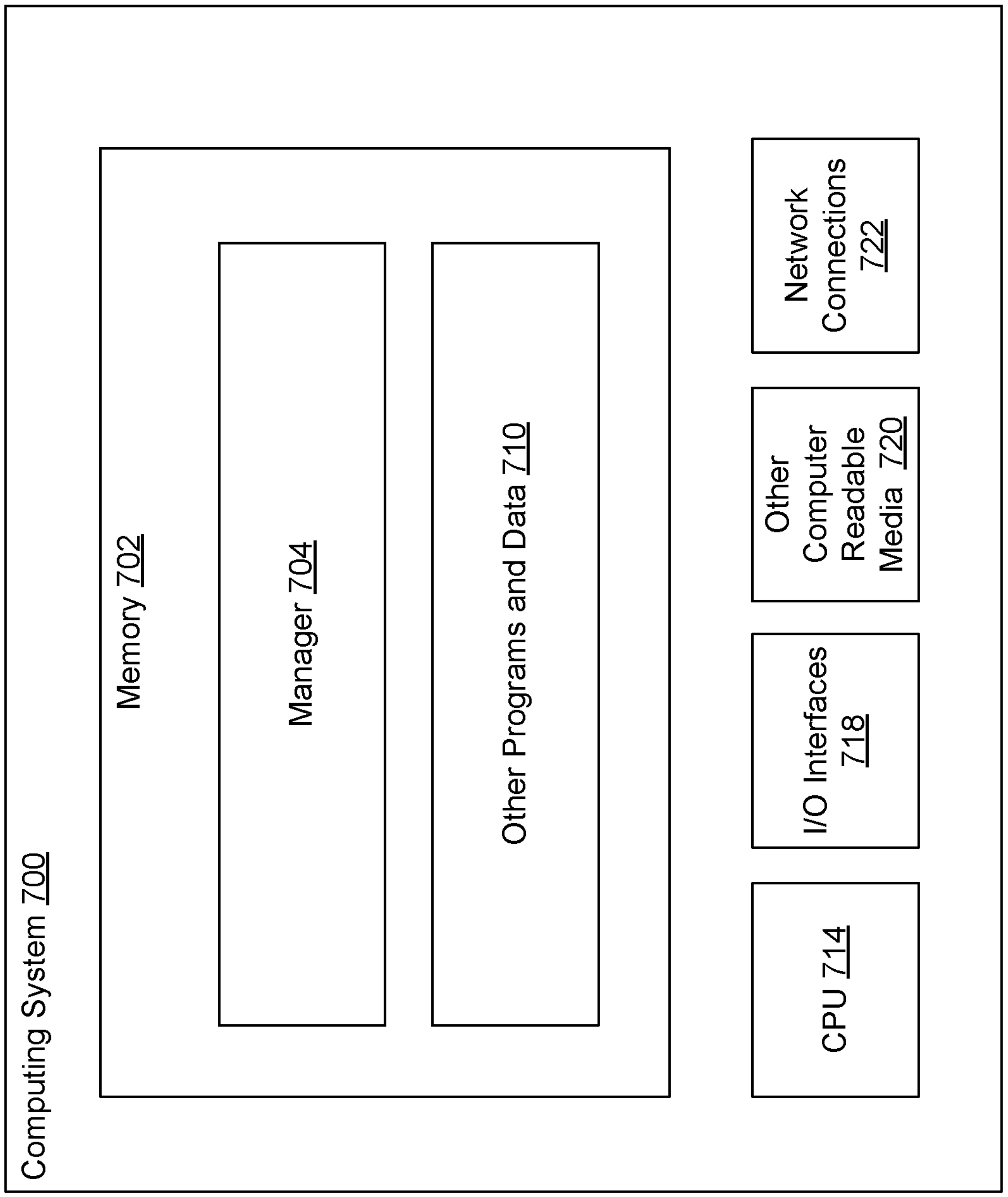
FIG. 7 shows a system diagram that illustrates an example computing system that implements and/or comprises one or more components of a system that implements multi-tenant network applications on a RIC platform.

FIG. 7 shows a system diagram that illustrates an example computing system 700 that implements and/or comprises one or more components of a system that implements multi-tenant network applications on a RIC platform as described herein.

In various embodiments, the computing system 700 can be implemented either as network elements on dedicated hardware, as a software instance running on dedicated hardware, or as a virtualized function instantiated on an appropriate platform, e.g., a cloud infrastructure. In some embodiments, many operations and functionality of such systems may be completely software-based and designed as cloud-native, meaning that they're agnostic to the underlying cloud infrastructure, allowing higher deployment agility and flexibility. Accordingly, various embodiments described herein may be implemented in software, hardware, firmware, or in some combination thereof. Computing system 700 may include memory 702, one or more central processing units (CPUs) 714, I/O interfaces 718, other computer-readable media 720, and network connections 722.

Memory 702 may include one or more various types of non-volatile and/or volatile storage technologies. Examples of memory 702 may include, but are not limited to, flash memory, hard disk drives, optical drives, solid-state drives, various types of random access memory (RAM), various types of read-only memory (ROM), other computer-readable storage media (also referred to as processor-readable storage media), non-transitory computer-readable medium, or the like, or any combination thereof. Memory 702 may be utilized to store information, including computer-readable instructions that are utilized by CPU 714 to perform actions, including embodiments described herein.

Memory 702 may have stored thereon access manager 704. The manager 704 is configured to implement and/or perform various control functions to implement operations of the multi-tenant network applications on a RIC platform described herein, such as with one or more processors. Memory 702 may also store other programs and data 710, which may include control systems for functionality for the cellular wireless telecommunication network, control systems for amplifying, digitizing, transmitting and receiving RF signals associated with radio towers for the cellular wireless telecommunication network, performance statistics, network interference management and statistics, quality of service management and statistics, throughput statistics, databases, user interfaces, operating systems, other network management functions, other NFs, etc.

Network connections 722 are configured to communicate with other computing devices, telecommunication equipment, computer network equipment and/or radio antennas, to perform operations of the computing system 700. In various embodiments, the network connections 722 may include transmitters and receivers to send and receive data as described herein; hardware that implements functionality of the multi-tenant network applications on a RIC platform for the cellular wireless telecommunication network; hardware that implements systems for amplifying, digitizing, transmitting and receiving the RF signals associated with radio towers for the cellular wireless telecommunication network; radio hardware including one or more amplifiers, filters, analog-to-digital (A/D) converters, wiring, antennas and base-station towers and/or interfaces thereto; etc.

I/O interfaces 718 may include video interfaces, other data input or output interfaces, or the like. In some embodiments, I/O interfaces 718 may include transmitters and receivers to send and receive data as described herein; hardware that implements systems for functionality of the multi-tenant network applications on a RIC platform for the cellular wireless telecommunication network; hardware that implements systems for amplifying, digitizing, transmitting and receiving the RF signals associated with radio towers for the cellular wireless telecommunication network; radio hardware including one or more amplifiers, filters, analog-to-digital (A/D) converters, wiring, antennas and base-station towers and/or interfaces thereto; etc.

Other computer-readable media 720 may include other types of stationery or removable computer-readable media, such as removable flash drives, external hard drives, or the like.

In some embodiments, one or more special-purpose computing systems may be used to implement systems of the manager 704. Accordingly, various embodiments described herein may be implemented in software, hardware, firmware, or in some combination thereof.

The various embodiments described above can be combined to provide further embodiments. These and other changes can be made to the embodiments and implementations in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of managing a multi-tenant Radio Access Network (RAN) intelligent controller (RIC) platform comprising:

- receiving a request to create muti-tenant resources for a first vendor and a second vendor on a RIC platform;
- generating a first private network with a first dedicated network controller associated with the first vendor based on the request to create the muti-tenant resources;
- assigning first dedicated network resources of the first private network associated with the first vendor based on the request to create the multi-tenant resources;
- generating a second private network with a second dedicated network controller associated with the second vendor based on the request to create the muti-tenant resources;
- assigning second dedicated network resources of the second private network associated with the second vendor based on the request to create the multi-tenant resources;
- managing first data associated with the first vendor using the first dedicated network controller and second data associated with the second vendor using the second dedicated network controller; and
- executing a network function using the first dedicated network resources based on the first data.

2. The method of claim 1, wherein the RIC platform is a non-real time RIC and the network function is a delay tolerant network function.

3. The method of claim 2, wherein the first dedicated network controller is a first dedicated rApplication (rAPP) and the second dedicated network controller is a second dedicated rAPP of the non-real time RIC.

4. The method of claim 1, wherein the first private network is only accessible with the first dedicated network controller and the second private network is only accessible with the second dedicated network controller.

5. The method of claim 4, wherein the first data associated with the first vendor in the first private network is not accessible by the second dedicated network controller.

6. The method of claim 1, wherein the RIC platform is a near-real time RIC and the network function is a time-sensitive network function.

7. The method of claim 6, wherein the first dedicated network controller is a first dedicated xAPP and the second dedicated network controller is a second dedicated xAPP of the near-real time RIC.

8. The method of claim 7, wherein the first dedicated xAPP accesses first vendor data from stored first private data of the first private network and the second dedicated xAPP accesses second vendor data from stored second private data of the second private network.

9. The method of claim 1, wherein the first private network and the second private network operate simultaneously on the RIC platform.

10. A non-transitory computer-readable medium encoding instructions that, when executed by at least one physical processor of a computing device, cause the computing device to perform a method comprising:

receiving a request to create muti-tenant resources for a first vendor and a second vendor on a Radio Access Network (RAN) intelligent controller (RIC) platform;

generating a first private network with a first dedicated network controller associated with the first vendor based on the request to create the muti-tenant resources;

assigning first dedicated network resources of the first private network associated with the first vendor based on the request to create the multi-tenant resources;

generating a second private network with a second dedicated network controller associated with the second vendor based on the request to create the muti-tenant resources;

assigning second dedicated network resources of the second private network associated with the second vendor based on the request to create the multi-tenant resources;

managing first data associated with the first vendor using the first dedicated network controller and second data associated with the second vendor using the second dedicated network controller; and executing a network function using the first dedicated network resources based on the first data.

11. The non-transitory computer-readable medium of claim 10, wherein the RIC platform is a non-real time RIC and the network function is a delay tolerant network function.

12. The non-transitory computer-readable medium of claim 11, wherein the first dedicated network controller is a first dedicated rAPP and the second dedicated network controller is a second dedicated rAPP of the non-real time RIC.

13. The non-transitory computer-readable medium of claim 10, wherein the first private network is only accessible with the first dedicated network controller and the second private network is only accessible with the second dedicated network controller.

14. The non-transitory computer-readable medium of claim 13, wherein the first data associated with the first vendor in the first private network is not accessible by the second dedicated network controller.

15. The non-transitory computer-readable medium of claim 10, wherein the RIC platform is a near-real time RIC and the network function is a time-sensitive network function.

16. The non-transitory computer-readable medium of claim 15, wherein the first dedicated network controller is a first dedicated xAPP and the second dedicated network controller is a second dedicated xAPP of the near-real time RIC.

17. The non-transitory computer-readable medium of claim 10, wherein the first private network and the second private network operate simultaneously on the RIC platform.

18. A system comprising:

a Radio Access Network (RAN) intelligent controller (RIC) platform within a telecommunications network, the RIC platform configured to perform operations, the operations including;

receiving a request to create muti-tenant resources for a first vendor and a second vendor on the RIC platform;

generating a first private network with a first dedicated network controller associated with the first vendor based on the request to create the muti-tenant resources;

assigning first dedicated network resources of the first private network associated with the first vendor based on the request to create the multi-tenant resources;

generating a second private network with a second dedicated network controller associated with the second vendor based on the request to create the muti-tenant resources;

assigning second dedicated network resources of the second private network associated with the second vendor based on the request to create the multi-tenant resources;

managing first data associated with the first vendor using the first dedicated network controller and second data associated with the second vendor using the second dedicated network controller; and executing a network function using the first dedicated network resources based on the first data.

19. The system of claim 18, wherein the RIC platform is a non-real time RIC, the first dedicated network controller is a first dedicated rAPP, and the second dedicated network controller is a second dedicated rAPP of the non-real time RIC.

20. The system of claim 18, wherein the RIC platform is a near-real time RIC, the first dedicated network controller is a first dedicated xAPP, and the second dedicated network controller is a second dedicated xAPP of the near-real time RIC.

* * * * *